US012525430B2

(12) United States Patent
Yachi et al.

(10) Patent No.: US 12,525,430 B2
(45) Date of Patent: Jan. 13, 2026

(54) CHARGED PARTICLE BEAM APPARATUS

(71) Applicant: Hitachi High-Tech Corporation, Tokyo (JP)

(72) Inventors: Kazufumi Yachi, Tokyo (JP); Muneyuki Fukuda, Tokyo (JP); Ichiro Tachibana, Tokyo (JP); Hiroya Ohta, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 551 days.

(21) Appl. No.: 17/921,737

(22) PCT Filed: Apr. 28, 2020

(86) PCT No.: PCT/JP2020/018074
§ 371 (c)(1),
(2) Date: Oct. 27, 2022

(87) PCT Pub. No.: WO2021/220388
PCT Pub. Date: Nov. 4, 2021

(65) Prior Publication Data
US 2023/0170182 A1 Jun. 1, 2023

(51) Int. Cl.
*H01J 37/28* (2006.01)
*H01J 37/145* (2006.01)
*H01J 37/244* (2006.01)

(52) U.S. Cl.
CPC .......... *H01J 37/28* (2013.01); *H01J 37/145* (2013.01); *H01J 37/244* (2013.01); *H01J 2237/057* (2013.01); *H01J 2237/2806* (2013.01)

(58) Field of Classification Search
CPC ........ H01J 37/28; H01J 37/145; H01J 37/244; H01J 2237/057; H01J 2237/2806;
(Continued)

(56) References Cited

U.S. PATENT DOCUMENTS 5,872,358 A * 2/1999 Todokoro ................ H01J 37/28
250/397
6,501,077 B1 * 12/2002 Sawahata ................ H01J 37/28
250/397
(Continued)

FOREIGN PATENT DOCUMENTS

JP 2004-71573 A 3/2004
JP 2006-216396 A 8/2006
(Continued)

OTHER PUBLICATIONS

International Search Report (PCT/ISA/210) issued in PCT Application No. PCT/JP2020/018074 dated Jun. 30, 2020 with English translation (five (5) pages).
(Continued)

*Primary Examiner* — David A Vanore
(74) *Attorney, Agent, or Firm* — Crowell & Moring LLP

(57) ABSTRACT

Proposed is a charged particle beam apparatus for the purpose of detecting a charged particle emitted from a sample in a specific direction by discriminating between the charged particle and a charged particle emitted in another direction. As one aspect of achieving the above purpose, proposed is a charged particle beam apparatus including an objective lens configured to focus a beam emitted from a charged particle source, a detector (8) configured to detect at least one of a first charged particle (23) emitted from a sample by irradiating the sample with the beam and a second charged particle emitted from a charged particle collided member by causing the first charged particle to collide with the charged particle collision member disposed on a trajectory of the first charged particle, and an electrostatic lens (12) including a plurality of electrodes disposed between the objective lens and the detector, in which the electrostatic lens is a Butler type.

8 Claims, 12 Drawing Sheets

(58) Field of Classification Search
CPC ............. H01J 2237/121; H01J 2237/21; H01J 2237/24578; H01J 2237/2448; H01J 2237/281; H01J 37/12
See application file for complete search history.

(56) References Cited

U.S. PATENT DOCUMENTS

| | | | | |
|---|---|---|---|---|
| 7,557,347 | B2* | 7/2009 | Shojo | H01J 37/153 |
| | | | | 250/397 |
| 10,497,535 | B2* | 12/2019 | Kumamoto | H01J 37/28 |
| 11,127,564 | B2* | 9/2021 | Kuo | H01J 37/244 |
| 11,257,658 | B2* | 2/2022 | Takahashi | H01J 37/12 |
| 2002/0053638 | A1* | 5/2002 | Winkler | H01J 37/28 |
| | | | | 250/306 |
| 2004/0108458 | A1* | 6/2004 | Gerlach | H01J 37/28 |
| | | | | 250/311 |
| 2006/0175548 | A1* | 8/2006 | Kawasaki | H01J 37/28 |
| | | | | 250/310 |
| 2006/0219953 | A1* | 10/2006 | Carleson | G01N 23/2251 |
| | | | | 250/492.21 |
| 2008/0056746 | A1* | 3/2008 | Suhara | G01R 31/305 |
| | | | | 399/56 |
| 2008/0099673 | A1* | 5/2008 | Fukuda | H01J 37/28 |
| | | | | 250/307 |
| 2008/0191135 | A1* | 8/2008 | Aoki | G01R 37/244 |
| | | | | 250/311 |
| 2008/0283744 | A1* | 11/2008 | Takada | H01J 37/21 |
| | | | | 250/311 |
| 2011/0139983 | A1* | 6/2011 | Doi | H01J 37/244 |
| | | | | 250/307 |
| 2014/0124666 | A1* | 5/2014 | Sasaki | H01J 37/244 |
| | | | | 250/310 |
| 2015/0213998 | A1* | 7/2015 | Winkler | H01J 37/1474 |
| | | | | 250/396 ML |
| 2017/0345613 | A1* | 11/2017 | Mizuhara | H01J 37/12 |
| 2019/0393014 | A1* | 12/2019 | Kawamoto | H01J 37/20 |
| 2023/0170182 | A1* | 6/2023 | Yachi | H01J 37/145 |
| | | | | 250/311 |

FOREIGN PATENT DOCUMENTS

| | | |
|---|---|---|
| JP | 2008-198471 A | 8/2008 |
| WO | WO 2016/092642 A1 | 6/2016 |

OTHER PUBLICATIONS

Japanese-language Written Opinion (PCT/ISA/237) issued in PCT Application No. PCT/JP2020/018074 dated Jun. 30, 2020 (four (4) pages).

Taiwanese-language Office Action issued in Taiwanese Application No. 110109768 dated Feb. 22, 2022 (five (5) pages).

Korean-language Office Action issued in Korean Application No. 10-2022-7037618 dated Sep. 19, 2024 (6 pages).

* cited by examiner

CHARGED PARTICLE BEAM APPARATUS

TECHNICAL FIELD

The present invention relates to a charged particle beam apparatus configured to detect a charged particle obtained by irradiating a sample with a charged particle beam, and more particularly, to a charged particle beam apparatus configured to selectively detect a charged particle emitted in a specific direction or a charged particle generated when the charged particle collides with another member.

BACKGROUND ART

A charged particle beam apparatus is an apparatus configured to observe a sample and form an image by irradiating the sample with a charged particle such as an electron beam and detecting the charged particle emitted from the sample.

In order to improve the detection efficiency of a secondary electron emitted from a sample, WO-A-2016/092642 (PTL 1) discloses a charged particle beam apparatus configured to widen a detectable emission angle range (hereinafter referred to as a detection angle range) by disposing a focusing lens coaxially with a primary particle and causing spatially widened secondary electrons to converge by a converging lens effect generated by a focusing lens electrode.

CITATION LIST

Patent Literature

PTL 1: WO-A-2016/092642 (corresponding US-A-2017/0345613)

SUMMARY OF INVENTION

Technical Problem

PTL 1 discloses a charged particle beam apparatus including an electrostatic lens including a plurality of electrodes configured to focus a secondary electron toward a deflection point of a deflector configured to deflect the secondary electron toward a detector. Further, a passage opening limiting member configured to partially limit passage of the secondary electron is provided between the detector and the electrostatic lens. The action of the electrostatic lens makes it possible to collect the secondary electron with high efficiency. Meanwhile, the secondary electrons emitted in a plurality of directions are detected in a mixed state thereof.

In the following description, proposed is a charged particle beam apparatus for the purpose of detecting a charged particle emitted in a specific direction by discriminating between the charged particle and a charged particle emitted in another direction.

Solution to Problem

As one aspect of achieving the above purpose, proposed is a charged particle beam apparatus including an objective lens configured to focus a beam emitted from a charged particle source, a detector configured to detect at least one of a first charged particle and a second charged particle, in which the first charged particle is emitted from a sample by irradiating the sample with the beam, and in which the second charged particle is emitted from a charged particle collided member by causing the first charged particle to collide with the charged particle collision member disposed on a trajectory of the first charged particle, and an electrostatic lens including a plurality of electrodes disposed between the objective lens and the detector, wherein the electrostatic lens is a Butler type.

Further, as another aspect of achieving the above purpose, proposed is a charged particle beam apparatus including an objective lens configured to focus a beam emitted from a charged particle source, a detector configured to detect at least one of a first charged particle and a second charged particle, in which the first charged particle is emitted from a sample by irradiating the sample with the beam, and in which the second charged particle is emitted from a charged particle collided member by causing the first charged particle to collide with the charged particle collision member disposed on a trajectory of the first charged particle, and an electrostatic lens including a plurality of electrodes disposed between the objective lens and the detector, wherein at least one of the plurality of electrodes is provided with a taper so that a thickness of the electrode becomes thinner in a direction of an optical axis of the beam as the electrode approaches the optical axis.

Advantageous Effects of Invention

According to the above configuration, it is possible to detect a charged particle emitted in a specific direction by discriminating between the charged particle and a charged particle emitted in another direction.

DESCRIPTION OF EMBODIMENTS

Figure 1:
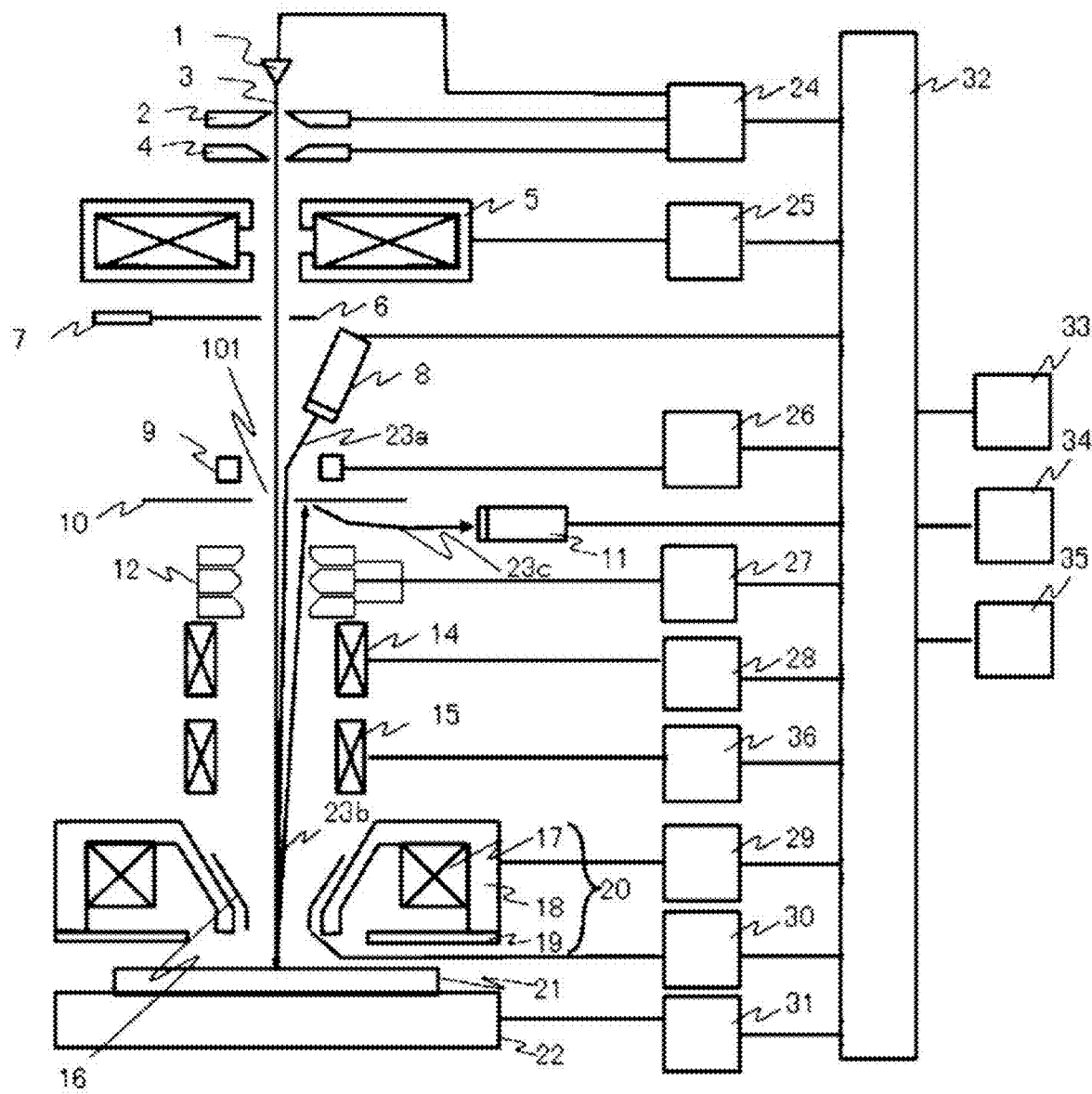
FIG. 1 is a schematic diagram of a scanning electron microscope according to a first embodiment.

Hereinafter, described is a charged particle beam apparatus including a detector configured to detect a secondary charged particle obtained by irradiating a sample with a primary particle beam (a particle beam such as an electron beam or an ion beam) and a focusing lens disposed between the detector and an objective lens and configured to focus a charged particle emitted from the sample, in which an electrode shape forming the focusing lens is a Butler type.

In a manufacturing process of a 3D-NAND, which is one of devices having a three-dimensional laminated structure, it is important to observe a bottom part of a hole or a groove with a high aspect ratio. Accordingly, in observation with a charged particle beam apparatus, it is desirable to use a technique of detecting a secondary electron emitted from the bottom part by selecting an optimum emission angle range in accordance with an aspect ratio. Furthermore, improvement of throughput is also important. In order to do so, a wider field-of-view movement range is required.

In order to select a detection angle range of a secondary electron or the like as described above, it is desirable that a secondary electron emitted from a sample is focused by a focusing lens, and a passage opening forming member provided with a passage opening capable of performing trajectory discrimination is used to allow a secondary electron emitted at a specific angle to selectively pass therethrough. Meanwhile, since focusing intensity of the focusing lens varies depending on a passage position of the focusing lens in an electron passage opening, secondary electrons emitted at different angles may reach the same position on an aperture. That is, charged particles emitted in different directions may be mixed and detected. Further, when different focusing action is received depending on a passage position of a lens, a secondary electron on a trajectory having a large relative angle with respect to an ideal optical axis of a beam receives stronger focusing action than a secondary electron on a trajectory having a small relative angle with respect to the ideal optical axis of the beam (a beam trajectory when a beam is not deflected). As a result, a relationship between a relative angle and a position of reaching a passage opening limiting member is not linear. Particularly, when the detection angle range is controlled up to a range in which an emission angle (a relative angle) is large, a secondary electron passes through the outer side of a focusing lens electrode, and as such, it is difficult to select a desired detection angle range.

Furthermore, when an arrival position of a primary particle is changed by a deflector (for example, a field-of-view moving deflector configured to perform high-speed movement between fields of view (FOV)), a secondary electron is also deflected by the deflector, and thus a position at which the secondary electron passes through the focusing lens electrode is changed. Accordingly, the detection angle range thereof is changed depending on the arrival position of the primary particle due to a change in convergence action on the secondary electron (hereinafter referred to as aberration).

In the following description, in view of the above situation, described is a charged particle beam apparatus configured to control a detection angle range of a secondary electron by preventing the aberration of the secondary electron caused by a focusing lens electrode and controlling a passage position of the focusing lens electrode depending on an arrival position of a primary particle.

In addition, described is a charged particle beam apparatus in which the shape of an electrode forming a focusing lens is made into a Butler shape having small aberration, the charged particle beam apparatus including a Wien filter configured to control a position at which a secondary electron passes through a focusing lens electrode.

It is possible to control the detection angle range of the secondary electron in a wide emission angle region regardless of an observation position on a sample by adopting the Butler-type lens and the Wien filter.

Hereinafter, a charged particle beam apparatus capable of selectively detecting a charged particle at a specific emission angle will be described with reference to the drawings.

More specifically, described is a charged particle beam apparatus configured to observe a sample and form an image by irradiating the sample with a charged particle beam (also referred to as a primary particle beam or a charged particle beam) and by detecting a charged particle emitted from the sample (a secondary electron, a backscattered electron, a secondary ion, or the like) or a charged particle (a tertiary electron or the like) generated when these charged particles collide with a conversion element such as a secondary electron conversion electrode, the charged particle beam apparatus using a Butler-type focusing lens or the like as a focusing element of the charged particle emitted from the sample. As a charged particle beam apparatus, there are various apparatuses such as a scanning electron microscope configured to detect a secondary electron or the like emitted from a sample by irradiating the sample with an electron beam, a transmission electron microscope configured to detect an electron transmitted through a sample, and a focused ion beam apparatus configured to observe a sample by irradiating the sample with a focused ion beam. In the following description, as an example of a charged particle beam apparatus, a scanning electron microscope in which both a primary particle beam and a secondary charged particle are electrons will be described.

First Embodiment

FIG. 1 is a schematic diagram of a scanning electron microscope according to a first embodiment. In the present embodiment, in order to measure a length of a pattern formed on a large-sized sample such as a semiconductor wafer and to inspect defects and foreign substances on the pattern, the energy of an electron beam, which is a primary particle beam, is set to low incident energy of several tens of eV to several keV. However, the present embodiment can be applied even if the energy of the electron beam is increased depending on a target sample and purpose.

A control arithmetic apparatus 32 reads a condition stored in a control table 35 and sets a voltage and a current in the apparatus by using an electron gun control unit 24, a focusing lens control unit 25, a Wien filter control unit 26, a focusing lens electrode control unit 27, a Wien filter control unit 36, a scanning deflector control unit 28, an objective lens control unit 29, an acceleration electrode control unit 30, and a sample holder control unit 31.

When an operator inputs an instruction to change a measurement condition, the control arithmetic apparatus 32 reads out the control table 35 and changes a control parameter. An electron 3 is emitted from a cathode 1 when an extraction voltage is applied between the cathode 1 and an extraction electrode 2. The emitted electron 3 is accelerated between the extraction electrode 2 and an anode 4, which is a ground potential. The energy of the electron beam, which is the electron 3 passing through the anode 4, coincides with an accelerating voltage between the cathode 1 and the anode 4. The electron beam (the primary particle beam) passing through the anode 4 is focused by a focusing lens 5, passes through a primary particle beam aperture 6, and receives scanning deflection by a deflector 15. Thereafter, the electron beam is narrowed by an objective lens 20 and reaches a sample 21. The objective lens 20 includes an objective lens coil 17, an upper magnetic pole 18, and a lower magnetic pole 19, and arrows down the primary particle beam by causing a magnetic field generated by the objective lens coil 17 to leak from a gap between the upper and lower magnetic poles and causing the magnetic field to concentrate on an axis of the primary particle beam. A method of narrowing down the primary particle beam is adjusted by changing a current amount of the objective lens coil 17.

A negative voltage is applied to a sample holder 22. The primary particle beam passing through the objective lens 20 is decelerated by a decelerating electric field generated between the objective lens 20 and the sample 21, and reaches the sample 21. Since the primary particle beam at the time of passing through the objective lens 20 has higher energy than the primary particle beam at the time of reaching the sample 21, chromatic aberration at the objective lens 20 is reduced in comparison with the case in which the primary particle beam having the energy at the time of reaching the sample 21 passes through the objective lens 20. As a result, at low incident energy as well, a thinner electron beam is obtained to achieve high resolution.

An opening angle of the primary particle beam at the objective lens 20 is determined by the primary particle beam aperture 6 disposed below the focusing lens 5. Centering of the primary particle beam with respect to the primary particle beam aperture 6 may be mechanically adjusted using an adjustment knob 7, or may be adjusted by deflection of the primary particle beam using an electrostatic deflector or a magnetic deflector separately provided before and after the primary particle beam aperture 6. The primary particle beam finely narrowed by the objective lens 20 is scanned on the sample 21 by the deflector 15.

When the sample 21 is irradiated with the primary particle beam, secondary electrons 23a and 23b are generated. The decelerating electric field generated between the objective lens 20 and the sample 21 acts as an accelerating electric field with respect to the secondary electrons 23a and 23b. As a result, the secondary electrons 23a and 23b are attracted into a path of the objective lens 20 and move upwards in the apparatus while receiving an accelerating electric field by an accelerating electrode 16 and lens action by the magnetic field of the objective lens 20. Here, the upper magnetic pole 18 of the objective lens 20 may be used as an accelerating electrode without installing a special electrode as the accelerating electrode 16, and a voltage may be applied to the upper magnetic pole 18 independently. In order to apply the voltage only to the upper magnetic pole 18, the upper magnetic pole 18 is insulated from the lower magnetic pole 19 by providing a space therebetween or interposing an insulator therebetween.

The secondary electron 23a (a first charged particle) having an angle formed with the optical axis which is the axis of the primary particle beam, the angle being smaller than that of the secondary electron 23b, passes through a hole of a particle beam passage opening 10. After that, the secondary electron 23a is deflected off the axis of the primary particle beam by a Wien filter 9 and detected by an upper detector 8 disposed on the side of the cathode 1 from an opening 101 provided in the particle beam passage forming member 10. Further, a secondary electron (a tertiary electron (a second charged particle)) may be detected, in which the secondary electron is generated by causing the secondary electron 23a to collide with a reflecting plate (a charged particle collision member) separately provided on a trajectory of a secondary electron deflected off the axis.

The secondary electron 23b having an angle formed with the optical axis, the angle being larger than that of the secondary electron 23a, collides with the particle beam passage opening 10. A secondary electron 23c generated by collision of the secondary electron 23b with the particle beam passage opening 10 is detected by a lower detector 11 disposed on the side of the sample 21 from the particle beam passage opening 10. The secondary electron 23b may be detected using a microchannel plate or a semiconductor detector instead of the particle beam passage opening 10. An image formed based on the secondary electrons 23a and 23b respectively detected by the upper detector 8 and the lower detector 11 is displayed on a monitor 34 and stored in a recording device 33.

A convergence effect of a focusing lens electrode on the secondary electron 23 can be changed by changing a voltage applied to a focusing lens electrode 12 using the focusing lens electrode control unit 27, and it is possible to change an emission angle range when the secondary electron 23 detected by the upper detector 8 is emitted from the sample 21 by allowing only the specific secondary electron 23a to pass through the opening 10.

The Wien filter is a deflector including a plurality of pairs of electrodes configured to generate a deflection electric field and a plurality of magnetic poles configured to generate a deflection magnetic field in a direction orthogonal to the deflection electric field. An orthogonal electromagnetic field generated by the Wien filter is adjusted to deflect any one of an electron beam and a secondary electron emitted from a sample in a specific direction and not to deflect the other. More specifically, any one of the electron beam and the secondary electron emitted from the sample is deflected by an electric field and a magnetic field, and deflection action by the deflection electric field of the other is adjusted to be offset by deflection action by the deflection magnetic field. In the case of an embodiment to be described later, an example using a Wien filter configured to selectively deflect a secondary electron while preventing deflection action on an electron beam will be described.

Figure 2:
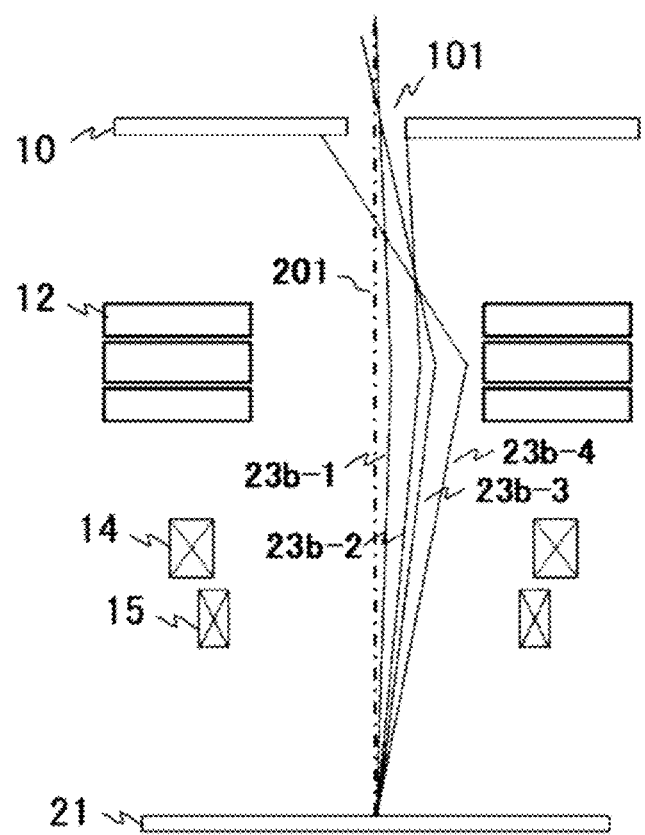
FIG. 2 is a schematic diagram of a secondary electron trajectory in a cylindrical focusing lens electrode.

FIG. 2 illustrates an optical system including an electrostatic lens (the focusing lens electrode 12) configured to adjust a detectable angle range by focusing a secondary electron emitted from a sample. The focusing lens electrode 12 includes a plurality of electrodes to which different voltages are applied. The plurality of electrodes forming the focusing lens electrode 12 have surfaces facing the electron beam (inner walls on the side of the electron beam), the surfaces being formed to be parallel to the optical axis, and the shape of the inner walls is a cylindrical shape. Further, the optical system illustrated in FIG. 2 includes the sample 21, the secondary electron 23, the deflector 15, a Wien filter 14, the focusing lens electrode 12, and the particle beam passage opening forming member 10 among the configurations illustrated in FIG. 1.

Secondary electrons emitted from the sample 21 pass through different trajectories depending on the emission directions thereof. As a specific example, the secondary electron 23b emitted from the sample 21 includes a secondary electron 23b-1 having a relative angle (an emission angle) with respect to a beam optical axis 201 (for example, an ideal optical axis of a beam when the beam is not deflected, the ideal optical axis being indicated by an alternate long and short dash line), the relative angle being relatively smaller than those of other secondary electrons, and secondary electrons 23b-2, 23b-3, and 23b-4 having emission angles relatively larger than that of the secondary electron 23b-1. For example, the secondary electrons 23b-1 and 23b-2 having small emission angles pass through the relatively inner side of a beam passage opening of the focusing lens electrode 12 and are focused by lens action.

On the other hand, since the secondary electrons 23b-3 and 23b-4 having large emission angles pass through the relatively outer side of the beam passage opening of the focusing lens electrode 12, the secondary electrons 23b-3 and 23b-4 are more deflected by spherical aberration than the secondary electrons 23b-1 and 23b-2. Therefore, secondary electrons having different emission angles may have the same trajectory when passing through the opening 101 of the particle beam passage opening forming member 10 configured to limit the trajectory of the secondary electron. In the example of FIG. 2, the trajectories of the secondary electrons 23b-1 and 23b-3 coincide with each other when the secondary electrons 23b-1 and 23b-3 pass through the opening 101.

Thus, even though the opening 101 is provided for the purpose of selectively detecting a secondary electron in a specific emission angle range by selectively allowing a secondary electron having a specific emission angle to pass therethrough, the secondary electrons 23b-1 and 23b-3 cannot be discriminated. Further, in the example of FIG. 2, a magnitude of an emission angle of a secondary electron, the particle beam passage opening forming member 10, and an arrival position at which the secondary electron reaches the opening thereof do not have a simple linear relationship, and as such, it is difficult to adjust a detection angle range of the secondary electron. Particularly, in consideration of extending the detection angle range thereof up to a wide emission angle, a secondary electron having an emission angle different from a desired detection angle range may be detected.

As described with reference to FIG. 2, it may be difficult to adjust the detection angle range of the secondary electron in the cylindrical focusing lens electrode 12 mainly due to the spherical aberration.

Therefore, in the present embodiment, described is a charged particle beam apparatus capable of selectively detecting a secondary electron in a desired emission angle range by easy adjustment even in an optical system that is premised on selectively detecting a secondary electron in an angle range having a large emission angle, in which at least one of the plurality of electrodes forming a secondary electron focusing lens is a Bulter type. Here, the Butler-type electrode is, for example, an electrode provided with a taper so that a thickness of the electrode becomes gradually thinner in a direction of an optical axis of the beam as the electrode approaches the optical axis, and the taper is formed with a curved surface or a flat surface. Further, the tapered surface is formed on one side surface or both side surfaces of the electrode. An electrostatic lens is formed of a plurality of electrodes including one or more Butler-type electrodes.

Figure 3:
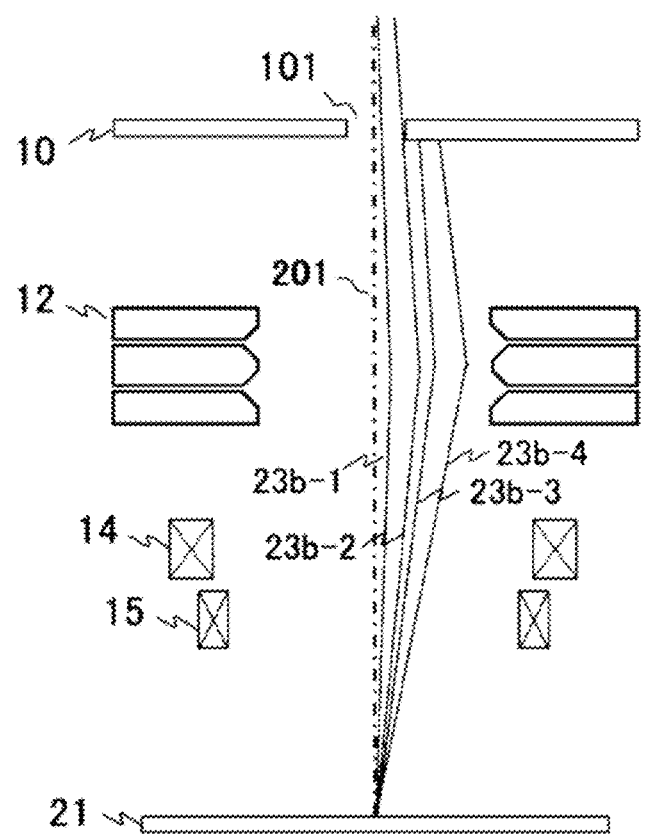
FIG. 3 is a schematic diagram of a secondary electron trajectory in a Butler-type focusing lens electrode.

FIG. 3 illustrates an optical system including a focusing lens electrode consisting of a plurality of electrodes including one or more Butler-type electrodes. FIG. 3 is a schematic diagram in the case in which the focusing lens electrode 12 includes the Butler-type electrode, and illustrates the sample 21, the secondary electron 23, the deflector 15, the Wien filter 14, the focusing lens electrode 12, and the particle beam passage opening forming member 10 among the configurations illustrated in FIG. 1. The particle beam passage opening forming member 10 includes the opening 101 configured to surround the electron beam optical axis 201 and to selectively allow an electron in a desired emission angle range to pass therethrough. It is possible to adjust the emission angle of the electron passing therethrough by adjusting a focusing condition of the focusing lens electrode 12.

By adopting the electrostatic lens including the Butler-type electrode illustrated in FIG. 3, it is possible to maintain a state in which the intensity of the focusing lens electrode 12 and the arrival position at which the secondary electron reaches the particle beam passage opening forming member 10 and the opening 101 become linear over a wide lens intensity range. In other words, when the secondary electron 23b is focused by the focusing lens electrode 12 including the Butler-type electrode having small aberration, an area in which the arrival position on the particle beam passage opening forming member 10 changes linearly with respect to the emission angle of the secondary electron 23 emitted from the sample 21 becomes wider. Therefore, the Butler-type focusing lens electrode 12 and the particle beam passage opening forming member 10 are combined with each other, thereby widening the controllable emission angle range of the detection angle range of the secondary electron 23, and improving controllability.

As illustrated in FIG. 3, spherical aberration can be prevented by using the Butler-type focusing lens electrode 12 as a focusing lens configured to focus a secondary electron, and particularly, it is possible to prevent focusing action on a secondary electron (for example, the secondary electron 23b-4) having a large relative angle with respect to the electron beam optical axis 201. As a result, a relationship between a relative angle of an emitted secondary electron with respect to the electron beam optical axis 201 and a distance between an arrival position of the secondary electron and the electron beam optical axis 201 on the same optical axis direction position (height) as the particle beam opening forming member 10 can be made linear, thereby making it possible to easily discriminate the direction of the secondary electron using the focusing lens electrode 12.

Figure 12:
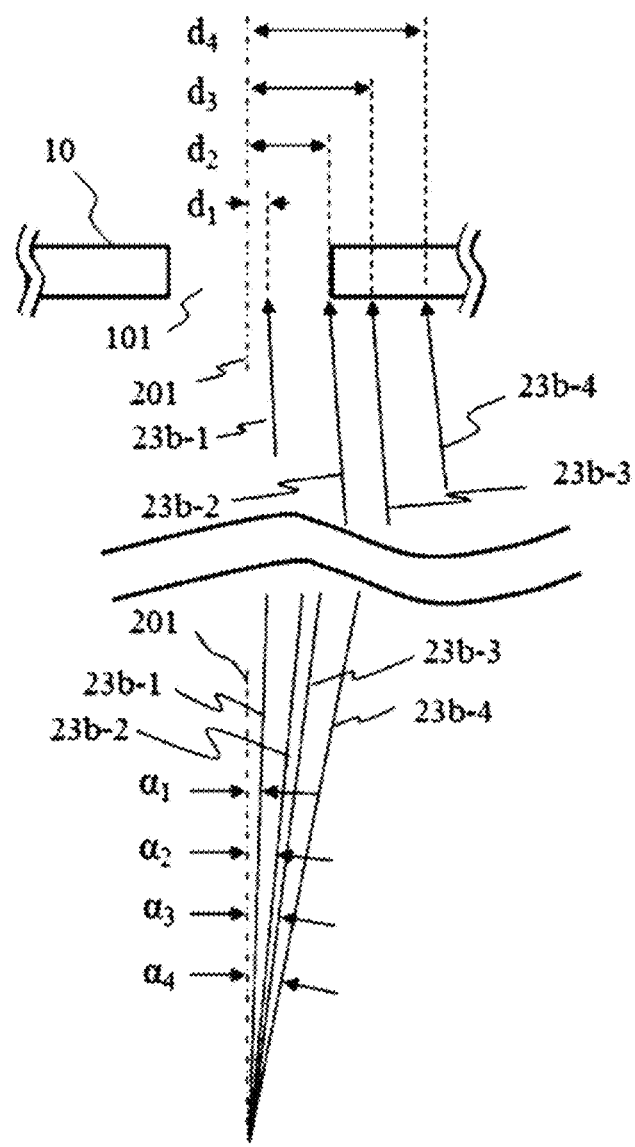
FIG. 12 is a diagram showing a relationship between a secondary electron trajectory adjusted by a focusing lens electrode and an arrival position of a secondary electron to a particle beam opening forming member.

FIG. 12 is a diagram showing a relationship between a secondary electron trajectory adjusted by the focusing lens electrode 12 and an arrival position of a secondary electron to the particle beam opening forming member 10. For example, the secondary electron 23b-1 is a secondary electron emitted at a relative angle $\alpha_1$ with respect to the electron beam optical axis 201, and the secondary electrons 23b-2, 23b-3, and 23b-4 are secondary electrons emitted at relative angles $\alpha_2$, $\alpha_3$, and $\alpha_4$, respectively. As illustrated in FIG. 12, when the emission directions of the secondary electrons (the relative angles with respect to the optical axis) are defined as $\alpha_4 > \alpha_3 > \alpha_2 > \alpha_1$, the Butler-type focusing lens electrode 12 in which distances between the arrival positions and the optical axis are defined as $d_4 > d_3 > d_2 > d_1$ is adopted, thereby making it possible to easily implement angle discrimination detection based on control of a voltage supplied to the lens.

The convergence action obtained when using a Butler-type focusing lens electrode can be smaller than that obtained when using a cylindrical lens having the same size, thereby making it possible to adjust a focusing condition with high accuracy in accordance with a voltage change.

Figure 4A:
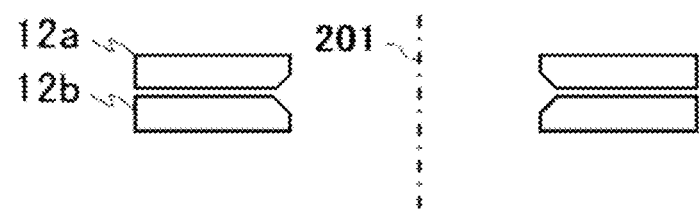
FIGS. 4A and 4B are diagrams showing definition of a Butler-type lens electrode.

FIG. 4 is a diagram illustrating the shape of a Butler-type lens electrode. FIG. 4(a) illustrates a Butler-type lens formed of two electrodes. The Butler lens is a type of electrostatic lens having a structure in which two or more circular electrode plates 12a and 12b are disposed in parallel. Here, the outer side of the circular electrode plate is flat, and a thickness of an inner side part surrounding the optical axis (the side closer to the optical axis) is formed to be thinner in the direction of the optical axis than that of an outer side part (the side relatively separated from the optical axis with respect to the inner side part). Further, as illustrated in FIG. 4, an inclined surface is provided on at least one of an upper side portion (an electron source side) of the electrode and a lower side portion (a beam irradiation target side) thereof, whereby the thickness of the electrode may be changed. For example, an electrode plate formed in a circle includes a circular opening through which an electron beam passes. In order to facilitate processing, a lens having a slightly modified shape can also be defined as a Butler lens or a Butler-type lens.

Figure 4B:
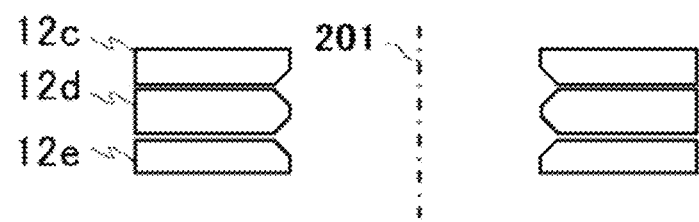

In the configuration illustrated in FIG. 1 or the like, a secondary electron focusing lens electrode consisting of three Einzel lenses illustrated in FIG. 4(b) is used as a secondary electron focusing lens electrode that does not change incident energy to a lens and emission energy from a lens. In this case, electrodes 12c and 12e are set to the same potential, and a potential of the electrode 12d is set to a negative potential with this potential as a reference. A positive potential may be applied to the electrode 12d.

A primary electron beam is scanned by the deflector 15 to acquire a sample image. When an observation position is changed, the primary electron beam is deflected by the deflector 15 in order to move a scanning deflection center (hereinafter referred to as a field-of-view center). The primary electron beam is deflected by the deflector 15 and the field-of-view center is moved, which is referred to as an image shift.

The deflector 15 also deflects the secondary electron 23 in addition to the primary electron beam. Accordingly, when the arrival position of the primary electron beam is changed by the deflector 15, a position at which the secondary electron 23 passes through the focusing lens electrode 12 also is changed, and as such, aberration of the secondary electron 23 due to the focusing lens electrode 12 is increased.

In order to defect the secondary electron in a desired angle range, a central trajectory of the secondary electron is controlled to pass through the vicinity of the center of the focusing lens electrode 12 and the center of the opening 101 regardless of the arrival position of the primary electron beam. This control can prevent a change in the detection range of the secondary electron 23 with respect to the arrival position of the primary electron beam.

Here, the central trajectory of the secondary electron refers to a trajectory that connects points having the highest density of the number of electrons in a cross section parallel to the sample 21 in a set of the secondary electrons generated from the sample.

Figure 5:
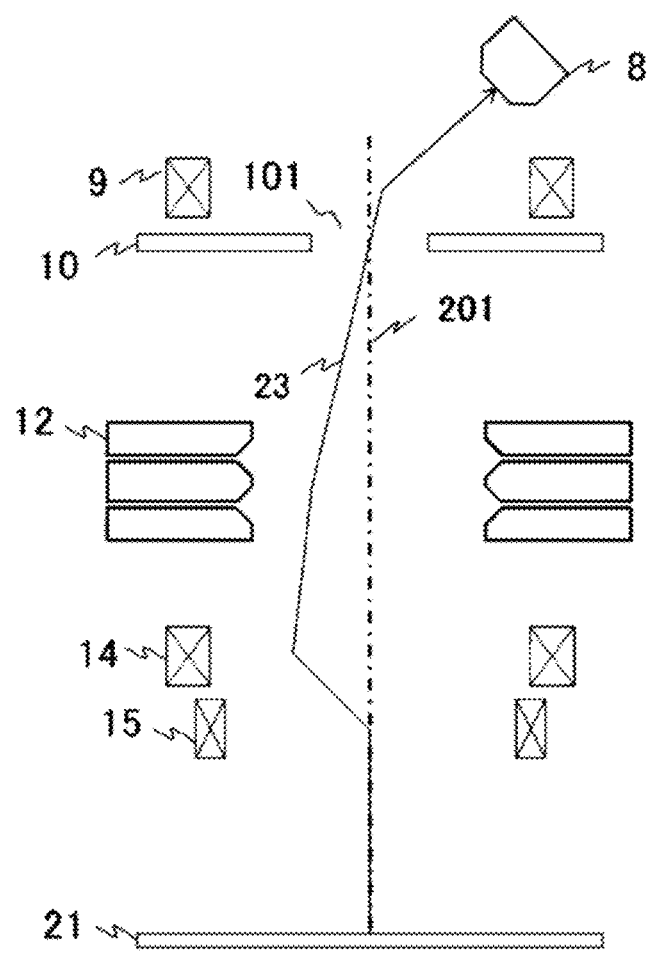
FIG. 5 is a schematic diagram of a secondary electron trajectory in which an influence of a deflector according to the first embodiment on a secondary electron is corrected by a Wien filter.

The control of the central trajectory of the secondary electron 23 by the first Wien filter 12 will be described with reference to FIG. 5. FIG. 5 is a schematic diagram of the control of the central trajectory of the secondary electron 23 by the first Wien filter 12, and illustrates the sample 21, the secondary electron 23, the deflector 15, the first Wien filter 14, the focusing lens electrode 12, the particle beam passage opening 101, the second Wien filter 9, the upper detector 8 among the configurations illustrated in FIG. 1.

The deflection angle is controlled by the first Wien filter 14 so that the central trajectory of the secondary electron 23 passing through the focusing lens electrode passes through the center of the opening 101.

The Wien filter consists of an electrode configured to apply an electric field in order to deflect a secondary electron and a coil configured to apply a magnetic field. Controlling the deflection angle means setting an electrode voltage and a coil current that deflect a secondary electron beam while maintaining the ratio of the electrode voltage and the coil current so that a primary electron beam is not deflected.

Figure 6:
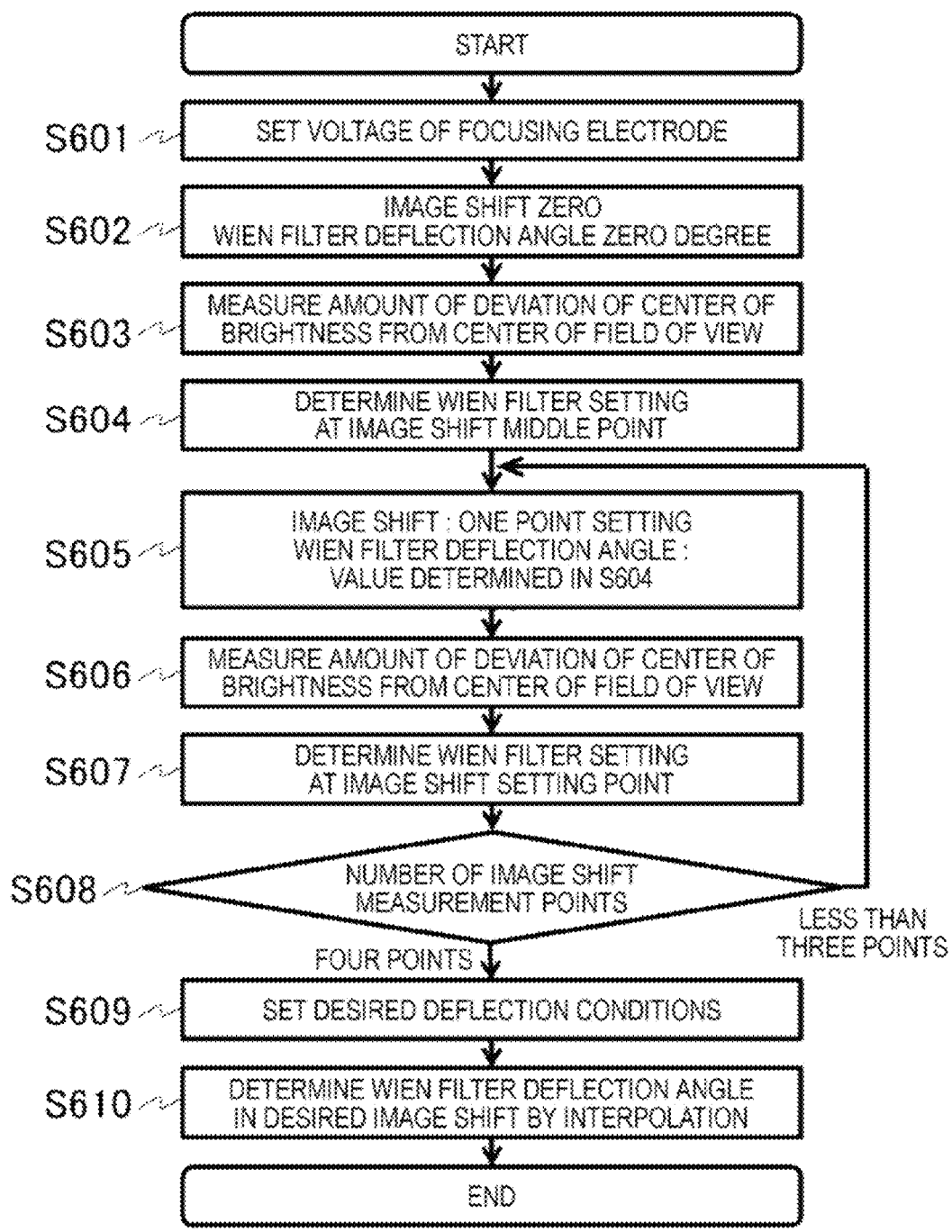
FIG. 6 is a flowchart in which Wien filter setting for an image shift is determined.

FIGS. 6 and 7 show a method of adjusting the deflection condition (the deflection angle) of the Wien filter 14 illustrated in FIG. 5 so that the central trajectory of the secondary electron 23 passing through the focusing lens electrode passes through the center of the opening 101 even when a beam is deflected under a desired image shift condition. In the present embodiment, described is an apparatus configured to perform field-of-view movement and beam scanning by superimposing a scanning signal configured to scan a beam and a field-of-view moving signal configured to move the field of view and supplying the superimposed signals to the deflector 15, but a field-of-view moving deflector and a scanning deflector may be provided separately.

First, in S601, a voltage of a focusing electrode is set. In the case of a condition under which a voltage is applied to a focusing lens, in order to detect a secondary electron in a desired emission angle range, the voltage applied to the focusing lens electrode 12 may be set by referring to information such as a desired detection angle range in a database or the like configured to store a relationship between a focusing lens condition (a condition of a voltage to be applied) and a detection angle range of the secondary electron.

Figure 7A:
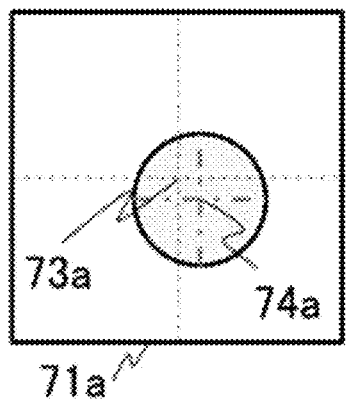
FIGS. 7A to 7D are diagrams showing an example of a GUI configured to specify a detection angle of a secondary particle using the scanning electron microscope according to the first embodiment.
Figure 7B:
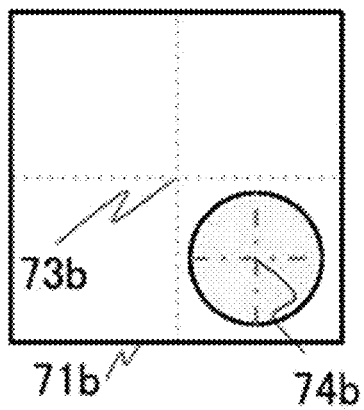
Figure 7C:
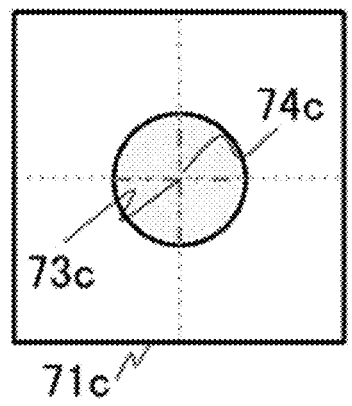
Figure 7D:
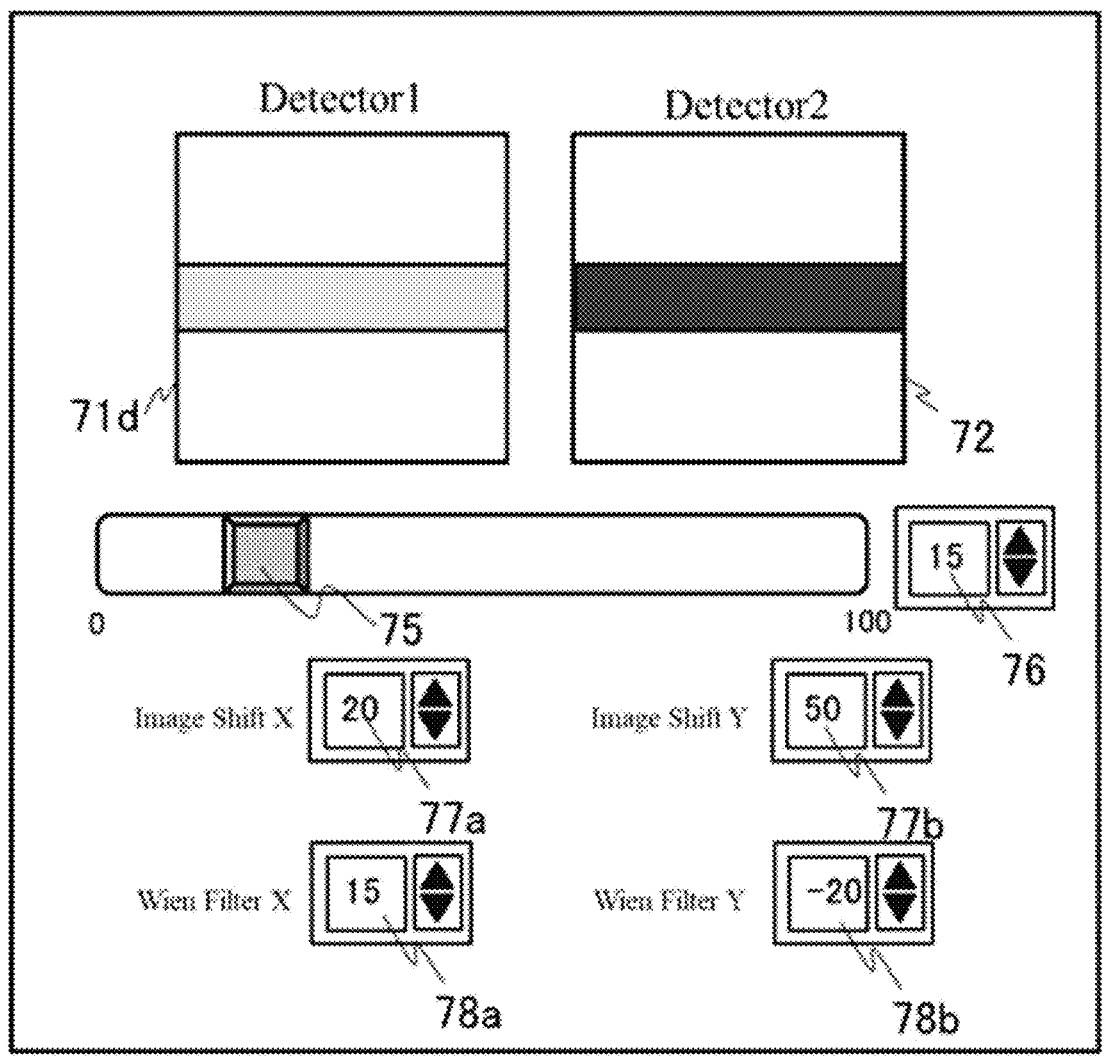

Next, under the conditions of an image shift zero (deflection is not performed by the field-of-view moving deflector) and the zero-degree of a Wien filter deflection angle (S602), a scanned image of a sample is acquired by the upper detector 8 in a wide field-of-view range (S603. FIG. 7(a)). Images illustrated in FIGS. 7(a), 7(b), and 7(c) are projection images of the opening 101, in which the projection images are obtained by scanning a beam over a wider range than the opening 101 on the particle beam opening forming member 10. An image 71a formed based on the output of the upper detector 8 is an image in which an image position corresponding to the opening 101 has high luminance.

The control arithmetic apparatus 32 (one or more computer systems) specifies a luminance center of the image formed based on the output of the upper detector 8 by image processing, and the control table 35 sets the deflection condition of the Wien filter so that the luminance center and the field-of-view center coincide with each other. More specifically, the control arithmetic apparatus 32 detects a position (a brightness center corresponding to the center of the opening 10) 74a at which the luminance (the signal amount) of the image 71a formed based on the output of the upper detector 8 becomes maximum, and the control table 35 determines the deflection angle of the Wien filter at which the brightness center 74a and a field-of-view center 73a (center of an image) coincide with each other.

The recording device 33 stores in advance a table or the like configured to store a relationship between deviation information (information on a direction and a deviation amount) between the brightness center 74a and the field-of-view center 73a and the deflection condition of the Wien filter (a correction condition). The control table 35 sets an appropriate deflection condition by referring to this related information.

Next, the control table 35 or the like configured by one or more computer systems or the like supplies a signal to the field-of-view moving deflector so that an amount of image shift (an amount of deflection of the field-of-view moving deflector) satisfies a predetermined condition (for example, the amount of deflection of the field-of-view moving deflector is maximum) in a state of maintaining the Wien filter condition detected in S604 (the deflection angle or the deflection condition). The control table 35 or the like supplies a signal to the deflector so as to scan the beam over a wide scanning range including the opening 101 as described above in this field-of-view moving state, and the secondary electron 23 emitted from the sample 21 based on the scanning is detected by the upper detector 8, thereby generating an image based on the output of the upper detector 8 (S606, FIG. 7(*b*)). The control arithmetic apparatus 32 or the like detects a brightness center 74*b* of a generated image 71*b* by image processing or the like, and obtains a deviation between the brightness center 74*b* and a field-of-view center 73*b*. The control table 35 or the like determines the deflection angle of the Wien filter at which the brightness center 74*b* and the field-of-view center 73*b* coincide with each other.

The above-mentioned processes of S605 to S607 are repeated at a total of four points in four image shift directions, and measurement results thereof are interpolated, thereby determining the deflection angle of the Wien filter for a desired image shift.

By applying the deflection angle determined by the processes illustrated in FIG. 6, a field-of-view center 73*c* and a brightness center 74*c* coincide with each other, as illustrated in FIG. 7(*c*). Under this condition, since the signal amount of the upper detector 8 is maximized at the field-of-view center, the central trajectory of the secondary electron 23 passes through the center of the opening 101.

FIG. 7(*d*) illustrates an example of a GUI (Graphical User Interface) screen specified by a detection angle range operator of a secondary electron. The GUI illustrated in FIG. 7(*d*) includes a first image display unit 71*d*, a second image display unit 72, a slider 75, an angle range specification box 76, image shift distance specification boxes 77*a* and 77*b*, and Wien filter deflection angle setting boxes 78*a* and 78*b*. The GUI screen is displayed on the monitor 34 and operated by the operator.

An image formed based on the detection by the upper detector 8 is displayed on the first image display unit 71*d*. An image formed based on the detection by the lower detector 11 is displayed on the second image display unit 72.

Figure 10:
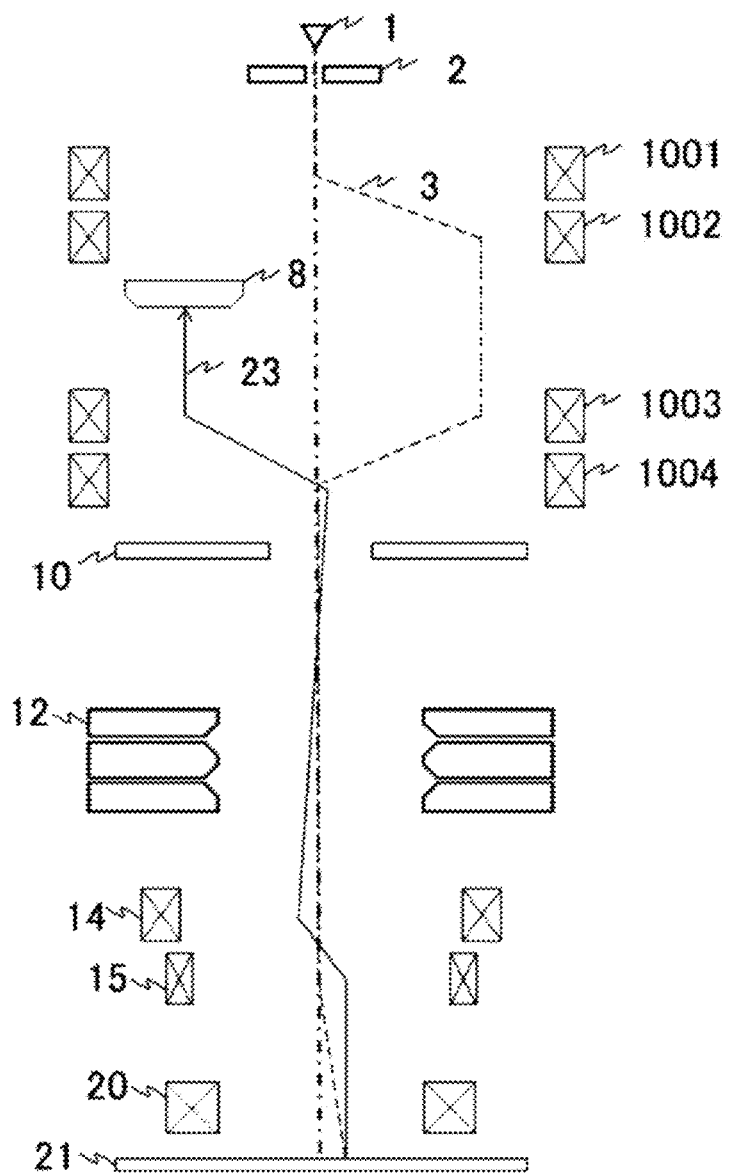
FIG. 10 is a schematic diagram of a scanning electron microscope according to a third embodiment.

The detection angle range detected by the upper detector 8 is set as a dimensionless numerical value from 0 to 100 in the slider 75 or the angle specification box 76. The numerical value displayed in the slider 75 or the angle specification box 55 may be a numerical value corresponding to the detection angle range, or may be a numerical value corresponding to the voltage of the focusing lens electrode 12. With the GUI of FIG. 7(*d*), the respective images formed based on the detections by the upper detector 8 and the lower detector 11 can be observed simultaneously. An image illustrated in FIG. 10 is an example when observing a groove pattern having a hole formed therein, and a first image display unit 53*a* can obtain a brighter image in a groove than a second image display unit 53*b*.

Second Embodiment

By increasing an image shift distance, the number of movements (mechanical movements) of the sample holder 22 can be reduced. When the image shift distance is increased, the secondary electron 23 is more significantly deflected by the deflector 15, and as such, a large number of the secondary electrons 23 passing through the outer side of the focusing lens electrode 12 are included. As a result, the influence of the aberration of the focusing lens electrode 12 on the secondary electron 23 passing through a trajectory separated from the ideal optical axis of the lens is increased.

In order to improve the controllability of discrimination detection using the focusing lens electrode 12 and the particle beam passage opening forming member 10 while extending the image shift distance, it is desirable to keep a passage position of the focusing lens electrode 12 constant regardless of an amount of movement of the field of view.

Figure 8:
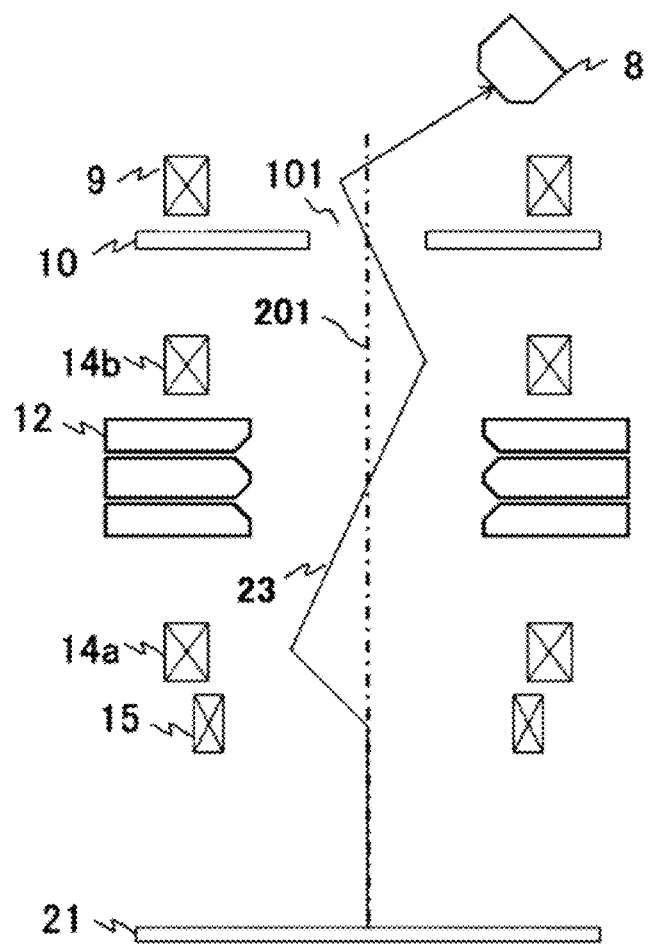
FIG. 8 is a schematic diagram of a scanning electron microscope and a secondary electron trajectory according to a second embodiment.
Figure 9:
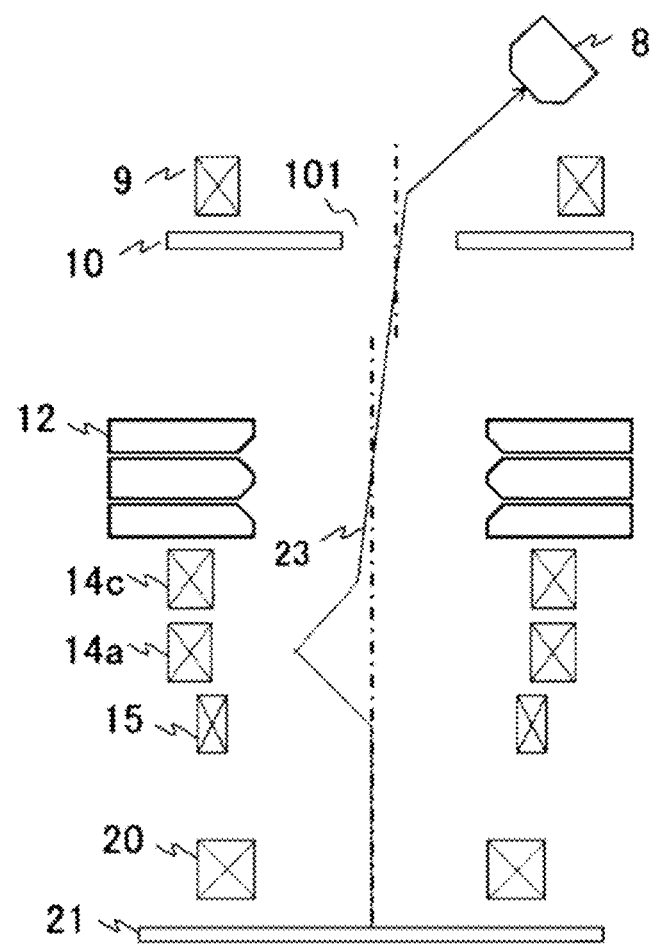
FIG. 9 is a schematic diagram of the scanning electron microscope and the secondary electron trajectory according to the second embodiment.

In the present embodiment, described is a scanning electron microscope configured to easily perform adjustment of a discrimination condition using a second Wien filter even if the amount of movement of the field of view is changed. According to the configuration of the present embodiment, it is possible to perform discrimination detection with excellent controllability. FIGS. 8 and 9 are diagrams illustrating the outline of the present embodiment. In FIGS. 8 and 9, the position at which the second Wien filter is disposed is different. In the example of FIG. 8, a third Wien filter 14*b* is added between the particle beam passage opening forming member 10 and the focusing lens electrode 12 compared to the optical system illustrated in FIG. 5. In the example of FIG. 8, the first Wien filter 14*a* is controlled so that the secondary electron 23 (for example, a secondary electron trajectory having a maximum electron amount (the brightness center) among the trajectories of the secondary electrons emitted from the sample 21) passes through the lens center of the focusing lens electrode 12 (for example, the intersection of the lens center of the electrostatic lens formed by the focusing lens electrode 12 (a lens principal surface) and the electron beam optical axis 201). Further, the third Wien filter 14*b* is controlled so that the secondary electron 23 passing through the focusing lens electrode 12 passes through the center of the opening 101.

Meanwhile, in the configuration illustrated in FIG. 9, two Wien filters are disposed between the focusing lens electrode 12 and the deflector 15. In the example of FIG. 9, the trajectory of the secondary electron 23 deflected by the deflector 15 is deflected by the first Wien filter 14*a*. The first Wien filter 14*a* deflects the secondary electron 23 so that a deflection fulcrum of the third Wien filter 14*c* is located on an extension line of an imaginary straight line connecting the center of the opening 101 (the intersection of the opening 101 and the beam optical axis) and the lens center of the focusing lens electrode 12.

The optical system illustrated in FIG. 9 describes the case in which a center axis of the focusing lens electrode 12 and a center axis of the opening 101 do not coincide with each other so that contents of trajectory control can be easily understood. The deflection angles (the deflection conditions) of the first Wien filter 14*a* and the third Wien filter 14*c* are adjusted so that the secondary electron 23 passes through the center of the focusing lens 12 and the center of the opening 101.

Third Embodiment

FIG. 10 is a diagram showing an optical system of a scanning electron microscope having a secondary electron focusing Butler-type lens mounted therein, in which the optical system includes a first deflector 1001 configured to deflect the electron 3 (the electron beam) emitted from the cathode 1 off the axis, a second deflector 1002 configured to deflect the electron beam again so that the electron beam deflected off the axis becomes parallel to the optical axis, a third deflector 1003 configured to deflect the electron beam deflected by the second deflector 1002 toward the optical axis, and a fourth deflector 1004 configured to deflect the electron beam deflected by the third deflector 1003 along the optical axis. The third deflector 1003 and the fourth deflector 1004 deflect the secondary electron 23 toward the upper detector 8 disposed off the axis. The electron beam is deflected off the axis by the first deflector 1001 and the second deflector 1002, and as such, the deflection action configured to guide the secondary electron off the axis (by the third deflector 1003 and the fourth deflector 1004) can offset the influence on the electron beam.

As illustrated in FIG. 10, in the case in which a magnetic field type deflector (the third deflector 1003 and the fourth deflector 1004) is adopted as a deflector configured to deflect the secondary electron off the axis, the same effect as the previous embodiment can also be obtained.

The optical system illustrated in FIG. 10 is different from the optical system illustrated in FIG. 1 in that four magnetic field type deflectors (the first to fourth deflectors 1001, 1002, 1003, and 1004) are adopted instead of the Wien filter 9. The four-stage magnetic field type deflectors are disposed between the primary particle beam aperture 6 and the particle beam passage opening forming member 10 as illustrated in FIG. 1.

The electron beam (the electron 3) is emitted from the cathode 1 to be propagated along the optical axis, deflected in a first direction by the first deflector (a magnetic deflection coil) 1001, deflected in a direction opposite to the first direction by the second deflector 1002 so as to be propagated along a secondary optical axis parallel to the optical axis, the secondary optical axis being spaced apart from the optical axis, deflected toward the optical axis in a second direction by the third deflector 1003, and deflected in a direction opposite to the second direction by the fourth deflector 1004 so as to be propagated along the optical axis. The primary electron beam takes a trajectory equivalent to a case in which the deflection is not performed by these four times of deflection.

The secondary electron 23 passing through the opening 101 is deflected by magnetic deflection coils 103 and 104 to be separated from the optical axis, and is detected by the upper detector 8.

Fourth Embodiment

In the first, second, and third embodiments, a detector separated from the optical axis in a specific direction is used, but the same effect can also be obtained by a method using an annular detector formed with a circular opening through which an electron beam passes.

Figure 11:
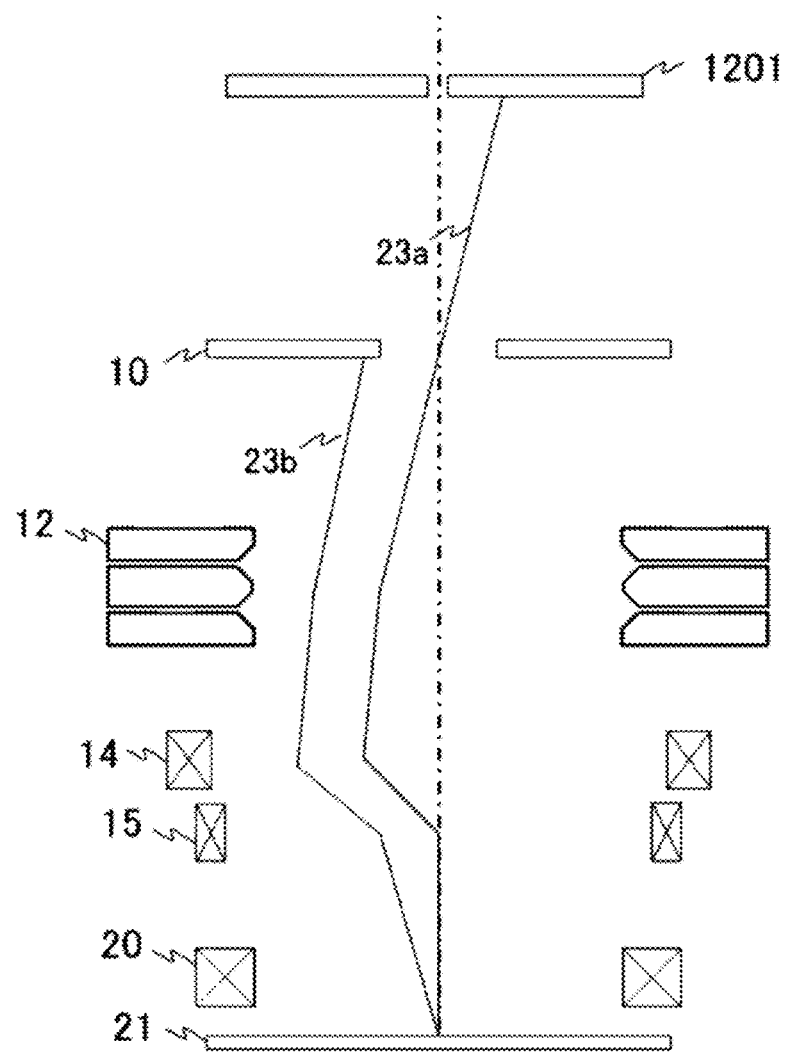
FIG. 11 is a schematic diagram of a scanning electron microscope according to a fourth embodiment.

FIG. 11 is a diagram showing an optical system in which an annular detector 1201 is adopted as a detector. The annular detector 1201 may be formed of a detection element such as a microchannel plate, and the annular detector 1201 may have an annular electrode provided therein and a new secondary electron (a tertiary electron) generated when the secondary electron collides with the electrode may be detected by a detector provided off the axis.

The annular detector 1201 is, for example, a particle beam passage opening forming member disposed between the particle beam passage opening forming member 10 and the primary particle beam aperture 6. By adjusting the focusing lens electrode 12, the secondary electron 23a passing through the particle beam passage opening forming member 10 and the secondary electron 23b colliding (filtered) with the particle beam passage opening forming member 10 are selected, thereby making it possible to perform direction discrimination detection.

Additionally, a discrimination detection method of a secondary electron method is not limited to the above embodiment, and includes various modifications. For example, the above embodiment has been described in detail to describe the discrimination detection method of the secondary electron method in an easy-to-understand manner. Here, the embodiment is not limited to those having all the configurations described herein, and a part of the configuration may be deleted. Further, a part of the configuration of one embodiment may be replaced with the configuration of another embodiment, or the configuration of another embodiment may be added to the configuration of one embodiment.

REFERENCE SIGNS LIST

1: cathode
2: extraction electrode
3: electron
4: anode
5: focusing lens
6: primary particle beam aperture
7: adjustment knob
8: upper detector
9: Wien filter
10: particle beam passage opening forming member
11: lower detector
12: focusing lens electrode
14: Wien filter
15: deflector
16: acceleration electrode
17: objective lens coil
18: upper magnetic pole
19: lower magnetic pole
20: objective lens
21: sample
22: sample holder
23: secondary electron
24: electron gun control unit
25: focusing lens control unit
26: Wien filter control unit
27: focusing lens electrode control unit
28: Wien filter control unit
29: objective lens control unit
30: acceleration electrode control unit
31: sample holder control unit
32: control arithmetic apparatus
33: recording device
34: monitor
35: control table
36: deflector control unit

The invention claimed is:

1. A charged particle beam apparatus comprising:
an objective lens configured to focus a beam emitted from a charged particle source;
a detector configured to detect at least one of a first charged particle and a second charged particle, in which the first charged particle is emitted from a sample by irradiating the sample with the beam, and in which the second charged particle is emitted from a charged particle collision member by causing the first charged particle to collide with the charged particle collision member disposed on a trajectory of the first charged particle; and
an electrostatic lens including a plurality of electrodes disposed between the objective lens and the detector,
wherein the electrostatic lens is a Butler lens.

2. The charged particle beam apparatus according to claim 1, further comprising:

a particle beam passage opening forming member disposed between the electrostatic lens and the detector; and one or more Wien filters disposed between the objective lens and the electrostatic lens, wherein the one or more Wien filters deflect the first charged particle so that the first charged particle passes through a center of a particle beam passage opening of the particle beam passage opening forming member.

3. The charged particle beam apparatus according to claim 2, wherein the one or more Wien filters deflect the first charged particle so that a secondary electron passes through the center of the particle beam passage opening, in which a trajectory of the secondary electron is changed by the electrostatic lens.

4. The charged particle beam apparatus according to claim 1, further comprising:
one or more Wien filters disposed between the objective lens and the electrostatic lens; and
a particle beam passage opening forming member disposed between the detector and the electrostatic lens,
wherein the one or more Wien filters deflect the first charged particle so that the first charged particle passes through a lens center of the electrostatic lens.

5. The charged particle beam apparatus according to claim 4, wherein the one or more Wien filters are configured to deflect the first charged particle so that a center trajectory of the first charged particle passes through the lens center of the electrostatic lens.

6. The charged particle beam apparatus according to claim 1, further comprising:
a particle beam passage opening forming member disposed between the electrostatic lens and the detector;
one or more Wien filters disposed between the objective lens and the electrostatic lens; and
a deflector configured to change an arrival position at which the beam reaches the sample,
wherein the one or more Wien filters deflect the first charged particle so that the first charged particle passes through a center of a particle beam passage opening of the particle beam passage opening forming member regardless of a deflection condition of the deflector.

7. The charged particle beam apparatus according to claim 1, wherein the detector is an annular detector including an opening through which the beam passes.

8. A charged particle beam apparatus comprising:
an objective lens configured to focus a beam emitted from a charged particle source;
a detector configured to detect at least one of a first charged particle and a second charged particle, in which the first charged particle is emitted from a sample by irradiating the sample with the beam, and in which the second charged particle is emitted from a charged particle collided by causing the first charged particle to collide with the charged particle collided member disposed on a trajectory of the first charged particle; and
an electrostatic lens including a plurality of electrodes disposed between the objective lens and the detector,
wherein at least one of the plurality of electrodes is provided with a taper so that a thickness of the electrode becomes thinner in a direction of an optical axis of the beam as the electrode approaches the optical axis.

* * * * *